United States Patent
Ilkorur et al.

(10) Patent No.: US 11,778,367 B2
(45) Date of Patent: Oct. 3, 2023

(54) IMPULSE PRESSURE REJECTING VALVE FOR AN ELECTRONIC DEVICE

(71) Applicant: Apple Inc., Cupertino, CA (US)

(72) Inventors: Onur I. Ilkorur, Campbell, CA (US); Christopher Wilk, Los Gatos, CA (US); Matthew A. Donarski, San Francisco, CA (US); Pablo Seoane Vieites, Sunnyvale, CA (US); Anthony P. Grazian, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 512 days.

(21) Appl. No.: 17/033,491

(22) Filed: Sep. 25, 2020

(65) Prior Publication Data

US 2022/0103934 A1 Mar. 31, 2022

(51) Int. Cl.
| H04R 1/28 | (2006.01) |
| H04R 9/06 | (2006.01) |
| H04M 1/03 | (2006.01) |
| H04R 1/10 | (2006.01) |

(52) U.S. Cl.
CPC .......... *H04R 1/2826* (2013.01); *H04M 1/035* (2013.01); *H04R 1/1041* (2013.01); *H04R 1/2811* (2013.01); *H04R 1/2849* (2013.01); *H04R 9/06* (2013.01); *H04R 2499/11* (2013.01)

(58) Field of Classification Search
CPC .... H04R 1/086; H04R 1/1083; H04R 1/1041; H04R 1/2811; H04R 1/2826; H04R 1/2849; H04R 9/06; H04R 2499/11; H04M 1/035
See application file for complete search history.

(56) References Cited

U.S. PATENT DOCUMENTS

| 5,790,679 | A | 8/1998 | Hawker et al. |
| 8,199,955 | B2 * | 6/2012 | Akino ................. H04R 1/1008 381/387 |
| 10,469,940 | B2 | 11/2019 | Taylor et al. |
| 10,869,141 | B2 * | 12/2020 | Albahri ................ H04R 25/456 |
| 2005/0069164 | A1 | 3/2005 | Muthuswamy et al. |
| 2014/0166140 | A1 | 6/2014 | Santos et al. |
| 2014/0169579 | A1 | 6/2014 | Azmi |
| 2014/0169585 | A1 | 6/2014 | Howes et al. |
| 2015/0230010 | A1 | 8/2015 | Suvanto et al. |
| 2016/0150310 | A1 * | 5/2016 | Bakalos ............... H04R 1/1041 381/372 |

(Continued)

FOREIGN PATENT DOCUMENTS

| CN | 110754095 | 2/2020 |
| CN | 210052026 | 2/2020 |

OTHER PUBLICATIONS

First Examination Report for Indian Application No. 202114039869 dated Jun. 9, 2022, 5 pages.

*Primary Examiner* — Huyen D Le
(74) *Attorney, Agent, or Firm* — Aikin & Gallant, LLP (57) ABSTRACT

A portable electronic device comprising: an enclosure having an enclosure wall that forms an interior chamber and a sound output port to an ambient environment; a speaker positioned within the interior chamber, the speaker having a front volume chamber coupling a sound output surface of the speaker to the sound output port and a back volume chamber acoustically coupled to the interior chamber by an aperiodic vent; and a valve operable to open and close the aperiodic vent in response to a pressure change.

20 Claims, 5 Drawing Sheets

(56) References Cited

U.S. PATENT DOCUMENTS

| | | |
|---|---|---|
| 2016/0277844 A1 | 9/2016 | Kopetz et al. |
| 2016/0381464 A1 | 12/2016 | Elyada |
| 2017/0280218 A1 | 9/2017 | Wang et al. |
| 2018/0091892 A1* | 3/2018 | Taylor .................. H04R 1/2811 |
| 2019/0313190 A1 | 10/2019 | Liang et al. |

* cited by examiner

IMPULSE PRESSURE REJECTING VALVE FOR AN ELECTRONIC DEVICE

FIELD

An aspect of the invention is directed to an impulse pressure rejecting valve that protects a speaker from excessive diaphragm excursion when a user interacts with the system enclosure. Other aspects are also described and claimed.

BACKGROUND

Portable communications devices (e.g., smart phones) have within them one or more speakers that convert an input electrical audio signal into a sound pressure wave output that can be heard by the user. The speakers can be used to, for example, output sound pressure waves corresponding to the voice of a far end user, such as during a telephone call, or to output sound pressure waves corresponding to sounds associated with a game or music the user wishes to play. Due to the relatively low profile of cellular devices, the speakers also have a relatively low profile, which in turn, can make it difficult to maintain a speaker back volume chamber which allows for maximum sound output in the low frequency ranges. For example, a change in the size of the internal volume of the device housing (such as when a user presses on the device), can have an impact on the speaker within the housing (e.g., increase a surrounding pressure on the speaker), and in some cases, the associated sound output.

SUMMARY

An aspect of the invention is directed to an impulse pressure rejecting valve that allows from coupling of a speaker back volume chamber to a system volume while also preventing a pressure input on a system or device enclosure from changing the excursion of the speaker or otherwise distorting sound output from the speaker. For example, the invention provides a valve between the speaker back volume chamber and the unused system volume of the enclosure. The valve may include a valve membrane or diaphragm positioned over an opening between the back volume chamber and the unused system volume. An aperiodic vent including a flow resistive mesh may be formed in the valve membrane or diaphragm to allow communication between the two volumes. By allowing communication between the two volumes and controlling the flow resistance using the flow resistive mesh, the back volume chamber can be made to behave acoustically larger than it is in physical dimension. This, in turn, may increase a low frequency output of the speaker, and at the same time, reduce the required volume for the enclosure. Since the volumes are in communication, however, when an increasing or decreasing pressure event of a sufficient magnitude occurs in the system volume chamber it could cause the speaker diaphragm to move in an undesirable way. The valve is therefore configured to close the opening in the back volume chamber as well as the aperiodic vent to prevent the increase/decrease in system volume pressure from reaching the speaker diaphragm. The pressure event could be, for example, the user pressing on the device display and/or enclosure (e.g., an increasing or positive impulse pressure) or discontinuing a pressing event (e.g., a decreasing or negative impulse pressure). For example, when a user interacts with the display, it is a transient event that is relatively short in duration but has a relatively high magnitude. When this event creates pressure, the operation of the speaker could be disturbed by moving the speaker higher/lower in response to the pressure event than what the audio signal is dictating (e.g., audio distortion). The valve is therefore pressure sensitive and closes in response to the pressure event caused by the user interaction to prevent the pressure event from impacting the speaker. Once the pressure event is gone and/or the pressure equalizes (e.g., via the aperiodic vent and/or a barometric vent in the system volume) the valve opens to allow communication between the back volume chamber and the system volume. This allows the system to achieve more continuous operation of low frequency boost and/or improved low frequency output performance using the vent.

Representatively, in one aspect a portable electronic device includes an enclosure having an enclosure wall that forms an interior chamber and a sound output port to an ambient environment; a speaker positioned within the interior chamber, the speaker having a front volume chamber coupling a sound output surface of the speaker to the sound output port and a back volume chamber acoustically coupled to the interior chamber by an aperiodic vent; and a valve operable to open and close the aperiodic vent in response to a pressure change. The pressure change may be a pressure increase in the interior chamber above a pressure in the back volume chamber, or a pressure decrease in the interior chamber below a pressure in the back volume chamber. The pressure increase or the pressure decrease may cause the valve to close the aperiodic vent to prevent the pressure increase or the pressure decrease from causing a vibration of the sound output surface of the speaker. The pressure increase or the pressure decrease may be caused by an external force applied to, or removed from, the enclosure wall. In another aspect, the pressure change may be a pressure equalization between the back volume chamber and the interior chamber, and the pressure equalization causes the valve to open the aperiodic vent to allow fluid flow between the back volume chamber and the interior chamber. The pressure equalization may occur through the aperiodic vent. The aperiodic vent may include a flow resistive mesh that allows a fluid to leak between the back volume chamber and the interior chamber when the aperiodic vent is open. The valve may include a compliant membrane between the back volume chamber and the interior chamber and the aperiodic vent is formed in the compliant membrane. In some aspects, to close the aperiodic vent, the compliant membrane seals to a first sealing surface between the compliant membrane and the back volume chamber or a second sealing surface between the compliant membrane and the interior chamber.

In another aspect, the portable electronic device includes an enclosure having an enclosure wall that forms an interior chamber; a driver module positioned within the interior chamber, the driver module having a driver and a module wall forming a back volume chamber of the driver, wherein the back volume chamber comprises an opening in the module wall to the interior chamber; and an impulse pressure rejecting valve coupled to the opening, the impulse pressure rejecting valve having a flow resistive mesh coupled to a valve diaphragm that transitions to a closed position in response to an impulse pressure and an open position in the absence of the impulse pressure. In one aspect, the driver is a speaker and the impulse pressure is different than a sound pressure output by the speaker. The impulse pressure may be caused by a user applying a force to, or removing a force from, the enclosure wall. In one aspect, in the closed position, the valve diaphragm prevents fluid flow between the back volume chamber and the interior chamber through the flow resistive mesh. In the open position, the valve diaphragm allows fluid flow between the back volume chamber and the interior chamber through the flow resistive mesh. In some aspects, the flow resistive mesh includes a resistivity sufficient to allow for pressure equalization of the impulse pressure over time so that the valve diaphragm transitions to the open position. The flow resistive mesh may be part of an aperiodic vent formed through the valve diaphragm. In some aspects, the valve diaphragm includes a center portion aligned with the opening in the module wall and a surround portion that couples the center portion to the module wall, and wherein the flow resistive mesh is coupled to the surround portion. In one aspect, in the closed position, the surround portion seals to a first sealing surface between the valve diaphragm and the back volume chamber or a second sealing surface between the valve diaphragm and the interior chamber. In some aspects, a positive impulse pressure seals the valve diaphragm to the first sealing surface. In another aspect, a negative impulse pressure seals the valve diaphragm to the second sealing surface.

In another aspect, a speaker module includes a module wall forming a front volume chamber having a sound output port and a back volume chamber having an aperiodic vent; a speaker having a sound output side coupled to the front volume chamber and a back side coupled to the back volume chamber; and a pressure sensitive valve coupled to the back volume chamber and operable to open and close the aperiodic vent. In one aspect, the aperiodic vent vents the back volume chamber to an enclosed chamber within which the speaker module is positioned. In some aspects, closing the aperiodic vent prevents a pressure change within the enclosed chamber from distorting a sound output from the sound output side of the speaker. In another aspect, opening the aperiodic vent acoustically couples the back volume chamber to the enclosed chamber to increase a size of the back volume chamber. In some aspects, the pressure sensitive valve include a valve diaphragm coupled to the module wall by a surround and a movement of the valve diaphragm in response to a pressure change opens or close the aperiodic vent. The aperiodic vent may include a flow resistive mesh coupled to an opening in the valve diaphragm. In one aspect, the pressure change may include pressure increase or a pressure decrease in an enclosed chamber surrounding the back volume chamber.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The aspects are illustrated by way of example and not by way of limitation in the figures of the accompanying drawings in which like references indicate similar elements. It should be noted that references to "an" or "one" aspect in this disclosure are not necessarily to the same aspect, and they mean at least one.

FIG. 6 illustrates a block diagram of one aspect of an electronic device within which the speaker including an impulse pressure rejecting valve of FIG. 1-FIG. 5 may be implemented.

DETAILED DESCRIPTION

In this section we shall explain several preferred aspects of this invention with reference to the appended drawings. Whenever the shapes, relative positions and other aspects of the parts described are not clearly defined, the scope of the invention is not limited only to the parts shown, which are meant merely for the purpose of illustration. Also, while numerous details are set forth, it is understood that some aspects of the invention may be practiced without these details. In other instances, well-known structures and techniques have not been shown in detail so as not to obscure the understanding of this description.

The terminology used herein is for the purpose of describing particular aspects only and is not intended to be limiting of the invention. Spatially relative terms, such as "beneath", "below", "lower", "above", "upper", and the like may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (e.g., rotated 90 degrees or at other orientations) and the spatially relative descriptors used herein interpreted accordingly.

As used herein, the singular forms "a", "an", and "the" are intended to include the plural forms as well, unless the context indicates otherwise. It will be further understood that the terms "comprises" and/or "comprising" specify the presence of stated features, steps, operations, elements, and/or components, but do not preclude the presence or addition of one or more other features, steps, operations, elements, components, and/or groups thereof.

The terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Figure 1:
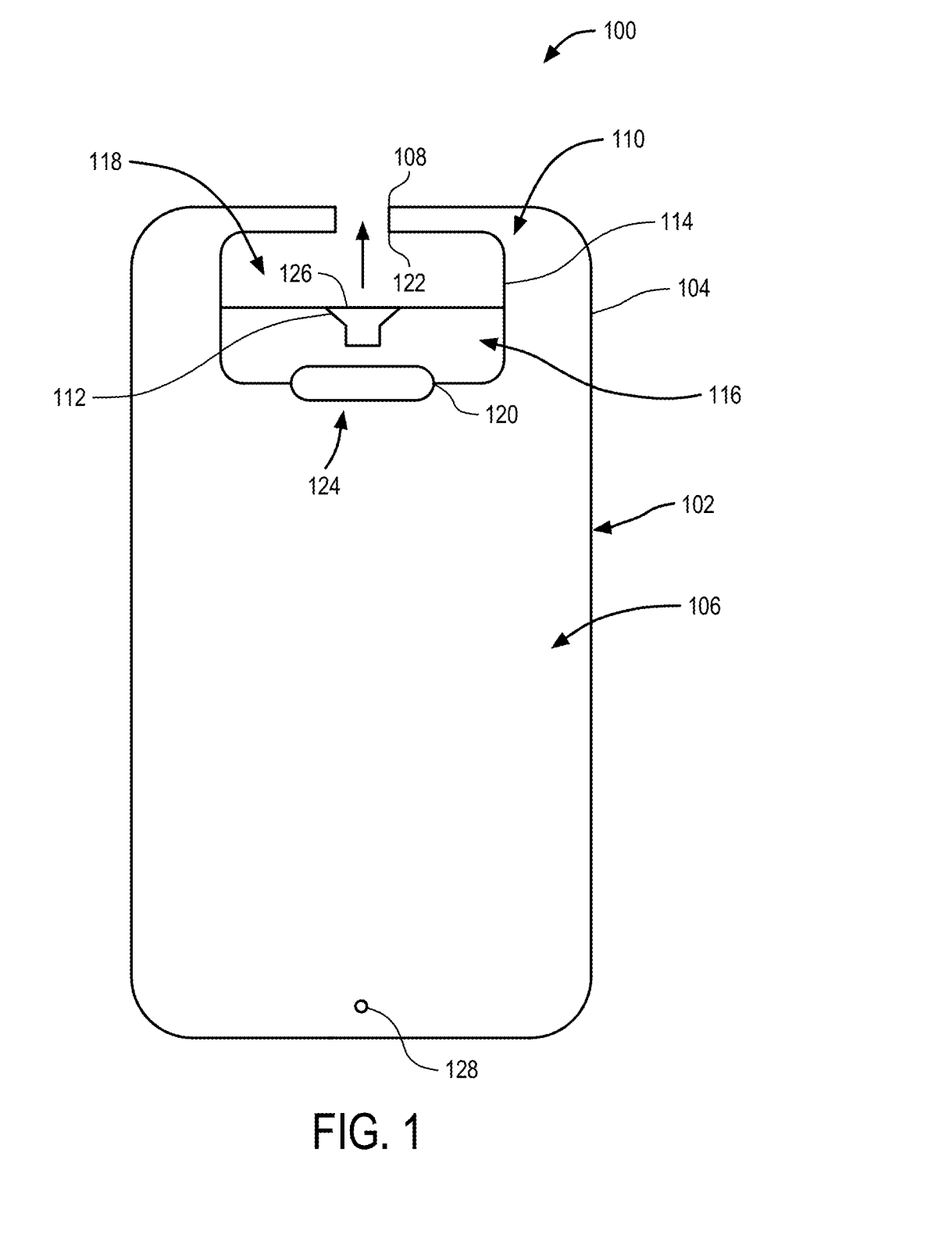
FIG. 1 illustrates a cross-sectional side view of one aspect of a speaker with an impulse pressure rejecting valve positioned within a portable electronic device.

FIG. 1 illustrates a cross-sectional side view of one aspect of a transducer positioned within a portable electronic device. The electronic device 100 may include a housing, casing or outer enclosure 102 that defines or closes off a chamber in which the constituent electronic components of electronic device 100, for example a portable or mobile communications device or portable time piece, are contained. Enclosure 102 may include an enclosure wall 104 that separates a surrounding environment from an encased space or interior chamber 106 formed within enclosure 102. In some cases, the enclosure wall 104 completely isolates or seals the interior chamber 106 from the surrounding environment. For example, the enclosure wall 104 may form a water-proof or acoustically isolated interior chamber 106 which is impermeable to water and/or air. In other aspects, the enclosure wall 104 may also include a barometric vent ("b-vent") or other type of vent 128 that connects the interior chamber 106 to the surrounding environment to help relieve and/or equalize pressure changes within the interior chamber 106. The interior chamber 106 may be of a sufficient volume and/or size to accommodate the constituent components of electronic device 100. In addition, the interior chamber 106 may contain an unused volume or space that can be shared with other components (e.g., a speaker) within interior chamber 106, as will be described in the discussion that follows. The enclosure wall 104 may also include one or more of an enclosure acoustic port 108. The enclosure acoustic port 108 may be, for example, a sound output port through which sound from a speaker positioned within interior chamber 106 may be output. In other aspects, where a microphone is positioned near enclosure acoustic port 108, it could be a sound input port to allow for input of sound to the microphone.

In this case, enclosure acoustic port 108 is a sound output port that is acoustically open to a speaker module 110 positioned within interior chamber 106. Representatively, speaker module 110 includes a module wall 114 that forms a chamber, casing, housing or inner enclosure within which speaker 112 is positioned. Speaker 112 may be any type of electroacoustic transducer capable of converting an electrical audio signal into a sound. In some aspects, speaker 112 may be a micro-speaker, for example, a miniaturized version of a loudspeaker that uses a moving coil motor to drive sound output. Thus, in some aspects, speaker 112 may be referred to herein as a micro-speaker. Speaker 112 may further be referred to herein as a speaker or receiver, depending on how it is being used. For example, in aspects where device 100 is positioned near the ear of a user such that speaker 112 is used to output sound from a far-end user to the near-end user holding device 100 (e.g., during a telephone call), speaker 112 may be referred to as a receiver or as being used in receiver mode. In other aspects where device 100 is positioned farther away from the user's ear and is, for example, being held in the user's hand for speaker phone usage, game play or listening to music, speaker 112 may be referred to as a speaker phone speaker or as being used in speaker mode.

Returning now to the structure of speaker module 110, the enclosure formed around speaker 112 by module wall 114 may be divided into a front volume chamber 118 and a back volume chamber 116 around speaker 112. The front volume chamber 118 may form a chamber around the sound output face or surface 126 of speaker 112 and allow for sound pressure waves output from surface 126 of speaker 112 to pass to speaker acoustic port 122 (as illustrated by the arrow). Speaker acoustic port 122 is formed in module wall 114 and aligned with enclosure acoustic port 108 so that sound output from speaker 112 can pass through front volume chamber 118, to speaker acoustic port 122 and out of enclosure 102 via enclosure acoustic port 108, to the surrounding environment (e.g., to the user). Back volume chamber 116 surrounds the back side of speaker 112 and is acoustically coupled to a side of the speaker 112 opposite the sound output surface 126 and front volume chamber 118. It is noted that any changes in size, volume and/or pressure of back volume chamber 116 may have an impact on the acoustic performance of speaker 112. For example, an increase in the size or volume of back volume chamber 116 could improve a low frequency response of speaker 112, while a decrease in the size or change in pressure of back volume chamber 116 could reduce or otherwise distort speaker performance.

With this in mind, an acoustic opening, vent or port 120 may be formed through the portion of the module wall 114 forming the back volume chamber 116 so that the back volume chamber 116 is open to the interior chamber 106. In other words, when port 120 is open as shown in FIG. 1, back volume chamber 116 shares a volume with interior chamber 106, and is therefore significantly increased. For example, in one aspect, back volume chamber 116 may have a volume of 5 cc, and interior chamber 106 may have approximately 10 cc of interior volume or space. Thus, when acoustic vent port 120 is open to interior chamber 106, the volume of back volume chamber is effectively tripled, or around 15 cc. This in turn, will increase a frequency response of speaker 112 at low frequency.

In addition, valve 124 may be coupled to the port 120 to regulate, or otherwise control, the coupling of back volume chamber 116 to interior chamber 106. It is generally desirable for acoustic vent port 120 to remain open, thus is most cases, valve 124 will remain open and not prevent communication between the back volume chamber 116 and the interior chamber 106. In some situations, however, it may be desirable to close acoustic vent port 120 using valve 124, and in turn, isolate back volume chamber 116 from interior chamber 106. For example, it may be desirable to isolate back volume chamber 116 from interior chamber 106 when a pressure within interior chamber 106 is increased or decreased, for example, due to a user interacting with the enclosure 102. For example, the pressure change may be caused by the user pressing their finger on the enclosure 102 (e.g., a cover glass that forms a user interface portion of the enclosure) or when the user stops pressing on the enclosure 102. These types of pressure events or actions by a user can cause a pressure increase (e.g., a positive pressure or positive pressure change) and/or a pressure decrease (e.g., a negative pressure or negative pressure change) within the interior chamber 106. These types of pressure changes may be referred to herein as an "impulse pressure" or "pressure impulse" because they may be relatively impulsive in nature, short in duration, and/or greater/less than a pressure change caused by the atmosphere. In addition, the pressure impulse may have different characteristics than, for example, a sound pressure output by the speaker 112 during operation. If back volume chamber 116 is not isolated from interior chamber 106, the pressure increase or decrease within interior chamber 106 could potentially increase or decrease a pressure within back volume chamber 116. This, in turn, may cause an undesired or unintentional movement or vibration of the speaker sound output surface 126 and distort the acoustic output of speaker 112. Thus, in such cases, valve 124 may be used to close acoustic vent port 120 and prevent the pressure change within interior chamber 106 from impacting speaker output. In addition, it should be understood that acoustic vent port 120 is considered to be relatively large, for example, larger than the barometric vent 128, such that in the open position, the two chambers are relatively open to one another (e.g., more open than in the case of a barometric relief port).

Valve 124 may be any type of pressure sensitive valve capable of transitioning between an open position and a closed position in response to a pressure change that is impulsive in nature (e.g., an impulse pressure or impulse pressure change). In the open position, valve 124 does not close acoustic vent port 120 (e.g., vent port 120 is open to interior chamber 106) and in the closed position valve 124 closes acoustic vent port 120 (e.g., acoustic vent port 120 is closed to interior chamber 106). In one aspect, valve 124 may be referred to as an impulse pressure rejecting valve because it closes in response to an impulse pressure within the interior chamber 106. In this aspect, valve 124 prevents the impulse pressure from being communicated to the back volume chamber 116 and causing an undesirable movement of the speaker sound output surface 126 that could distort the acoustic output of speaker 112. In the absence of an impulse pressure or impulse pressure change, however, valve 124 may remain open (e.g., vent port 120 is open to interior chamber 106). For example, valve 124 does not close in response to a sound pressure output by the speaker 112 and instead remains open so that the back volume chamber 116 is open to the interior chamber 106.

Figure 2:
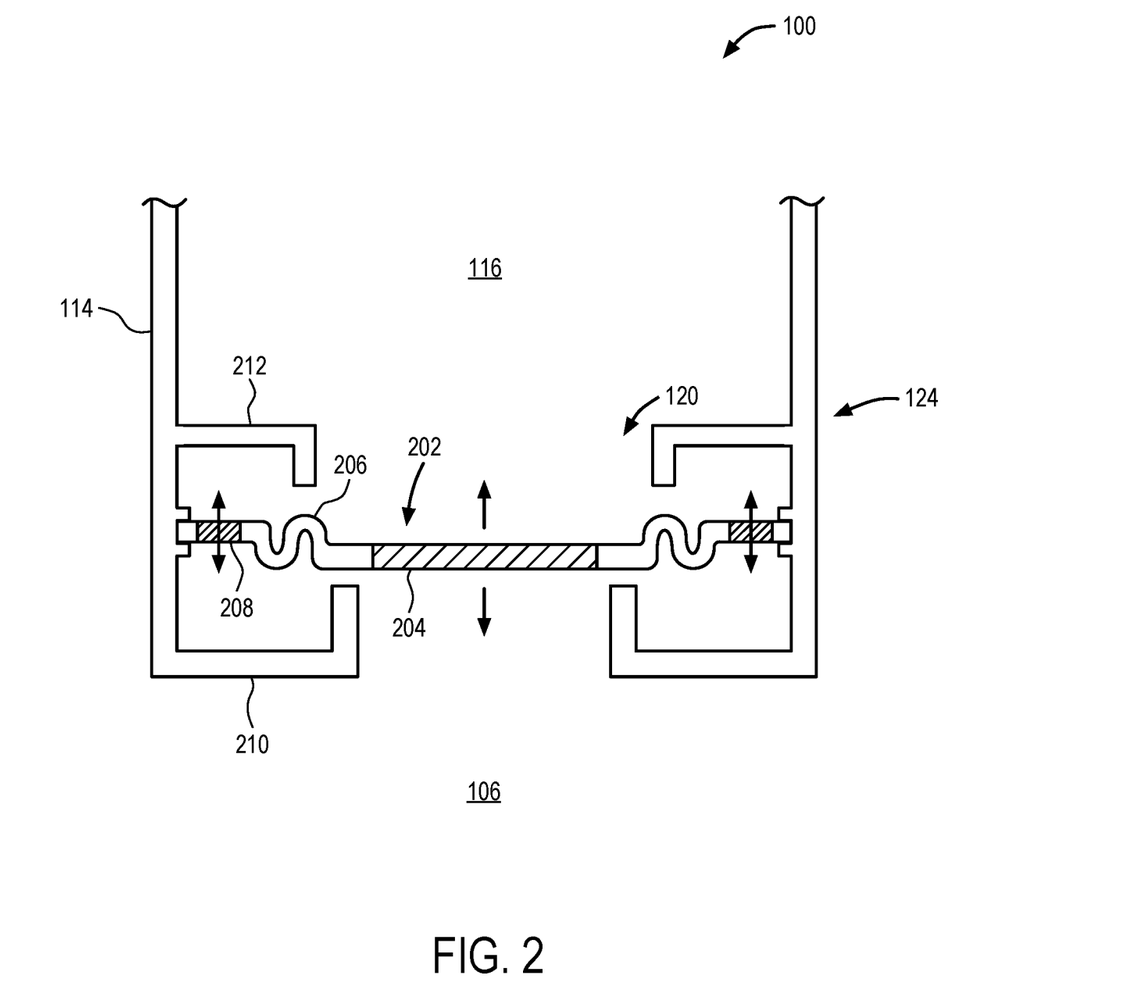
FIG. 2 illustrates a cross-sectional side view of one aspect of an impulse pressure rejecting valve.

Referring now to FIG. 2-FIG. 5, FIG. 2-FIG. 5 are schematic diagrams showing cross-sectional side views of a representative valve from FIG. 1. Representatively, referring now to FIG. 2, FIG. 2 shows valve 124 coupled to the acoustic vent port 120 between the back volume chamber 116 and the interior chamber 106. In this view, valve 124 is in a natural resting or open position in which it does not close acoustic vent port 120 and allows fluid flow (e.g., air) between back volume chamber 116 and interior chamber 106. In particular, valve 124 includes a valve membrane or diaphragm 202 that may be mounted (e.g., mechanically or chemically attached) to the module wall 114. For example, valve membrane or diaphragm 202 may be mounted to a portion of the module wall 114 forming the port 120 and/or the back volume chamber 116. Valve membrane or diaphragm 202 may extend entirely across the port 120 and have a similar size and/or shape as the port 120. For example, where the port 120 has a circular or square shape, the valve membrane or diaphragm 202 may have a similar shape. In this aspect, valve membrane or diaphragm 202 may be considered as defining a portion of the back volume chamber 116 and/or otherwise be considered positioned between the back volume chamber 116 and interior chamber 106. Valve membrane diaphragm 202 may include a center portion 204 that is aligned with a center of port 120 and a suspension member or surround 206 that connects the center portion 204 to the wall 114. The valve membrane or diaphragm 202 may be relatively compliant such that it may move in the direction of the arrows in response to the impulse pressure or pressure change in the interior chamber 106. For example, valve diaphragm 202 may be a silicone membrane that will move in response to the impulse pressure.

An aperiodic vent 208 may be formed through the surround 206 to allow for fluid communication between the back volume chamber 116 and the interior chamber 106 as illustrated by the arrows. In other words, when the valve 124 is open as shown in FIG. 2, the back volume chamber 116 is acoustically open to the interior chamber 106 via the aperiodic vent 208 such that a size of the back volume chamber 116 is effectively increased. The aperiodic vent 208 may be formed by an opening in the surround 206 and a flow resistor mesh within the opening to regulate the fluid flow through the opening. Although only a left most portion of the aperiodic vent 208 is shown, it should be understood that vent 208 may be one discrete vent, multiple vents or formed by one continuous opening/mesh structure that extends entirely around the surround 206 and/or the center portion 204 of the valve membrane or diaphragm 202. In one aspect, the flow resistor mesh may be substantially resistant to a fluid flow caused by an impulse pressure in the interior chamber 106, however, substantially non-resistant to a fluid flow between the interior chamber 106 and the back volume chamber 116 in the absence of the impulse pressure. Representatively, in one aspect, the flow resistor mesh may have a resistivity of from about 65 Rayleigh to about 160 Rayleigh.

In this aspect, when the valve 124 is open, the aperiodic vent 208 allows for a constant "leak" between the back volume chamber 116 and the interior chamber 106. Thus, when valve 124 is open, aperiodic vent 208 is also considered open. When the valve 124 is closed, however, it also closes the aperiodic vent 208 because it prevents fluid communication between the back volume chamber 116 and the interior chamber 106 via the aperiodic vent 208. Representatively, valve 124 may include a first sealing surface 212 and a second sealing surface 210 that are positioned on opposite sides of the valve diaphragm 202. For example, as can be seen from FIG. 2, first sealing surface 212 is between valve diaphragm 202 and the back volume chamber. Second sealing surface 210 is between valve diaphragm 202 and the interior chamber 106. The first and second sealing surfaces 212, 210 may be arm like members or hard stops that could be formed from or by the module wall 114. In this aspect, when valve diaphragm 202 moves in the direction of the arrows in response to an impulse pressure, the surround 206 contacts and seals to one of the first sealing surface 212 or the second sealing surface 210 to close the valve 124. Since the aperiodic vent 208 is positioned between the portion of the surround 206 that seals to surface 212 or surface 210 and the module wall 114, closing of the valve also close the aperiodic vent 208 because fluid can no longer flow between the interior chamber 106 and back volume chamber 116 via aperiodic vent 208. The aperiodic vent 208 may, however, allow the impulse pressure to slowly equalize across the valve diaphragm 202. The enclosure may also have a barometric vent (e.g., b-vent 128) to help with pressure equalization as previously discussed. Once the pressure equalizes, the valve 124 will transition back to the open position. The transitioning of valve 124 between the open and closed positions in response to the impulse pressure will now be described in more detail in reference to FIG. 3-FIG. 5.

Figure 3:
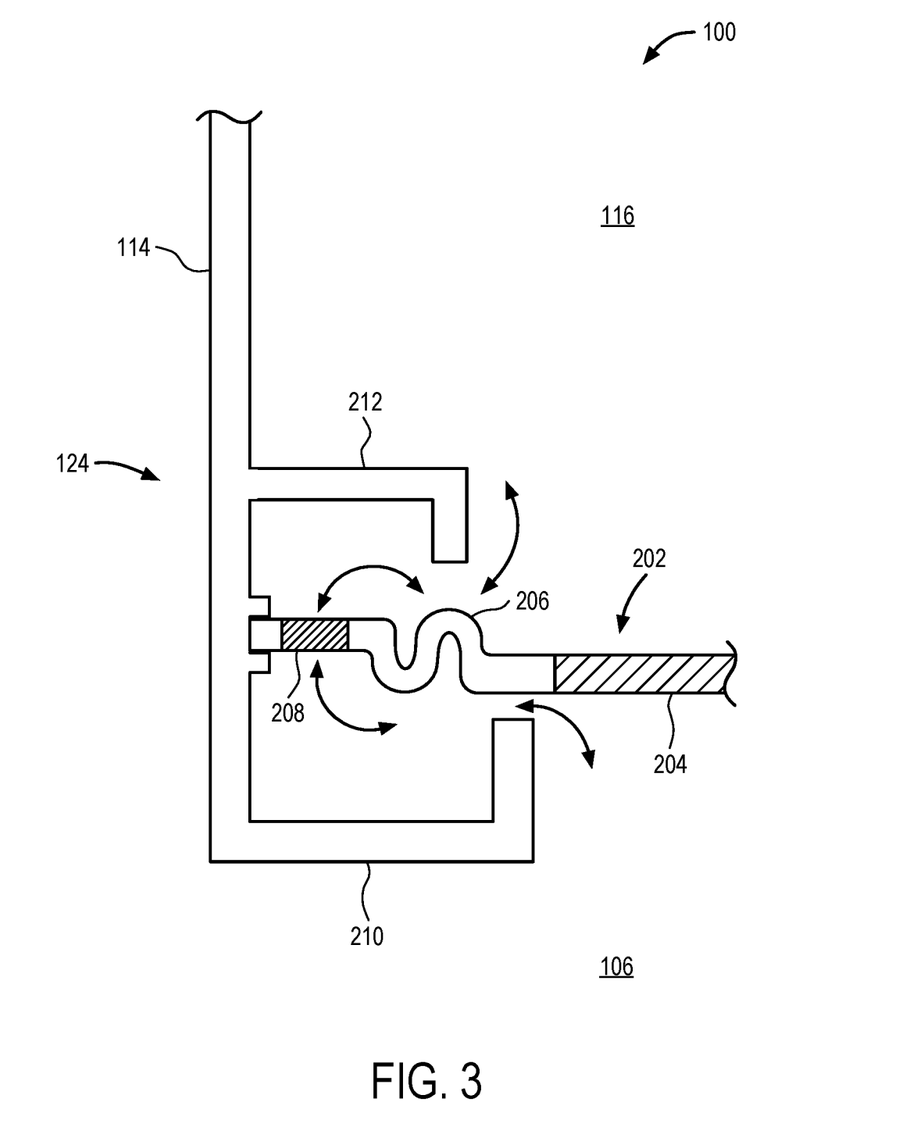
FIG. 3 illustrates a magnified cross-sectional side view of the impulse pressure rejecting valve of FIG. 2 in an open position.

FIG. 3 illustrates a magnified cross-sectional view of a left side of the valve 124 in the open position. From this view, it can be seen that in the open position, a space is formed between the surround 206 and both the first sealing surface 212 and the second sealing surface 210. Accordingly, a fluid (e.g., air) can travel between the back volume chamber 116 and the front volume chamber 118 through aperiodic vent 208 as illustrated by the arrows. Valve 124 is therefore considered to be in an open position in FIG. 3 and aperiodic vent 208 is also considered open. Valve 124 may also be considered to be in a normal or resting position when it is open. Valve 124 may be in the normal, resting or open position when, for example, there is no pressure change or impulse pressure in the interior chamber 106 or the pressure in the back volume chamber 116 and the pressure in the interior chamber are substantially equal, or at least more equal than when the impulse pressure occurs.

Figure 4:
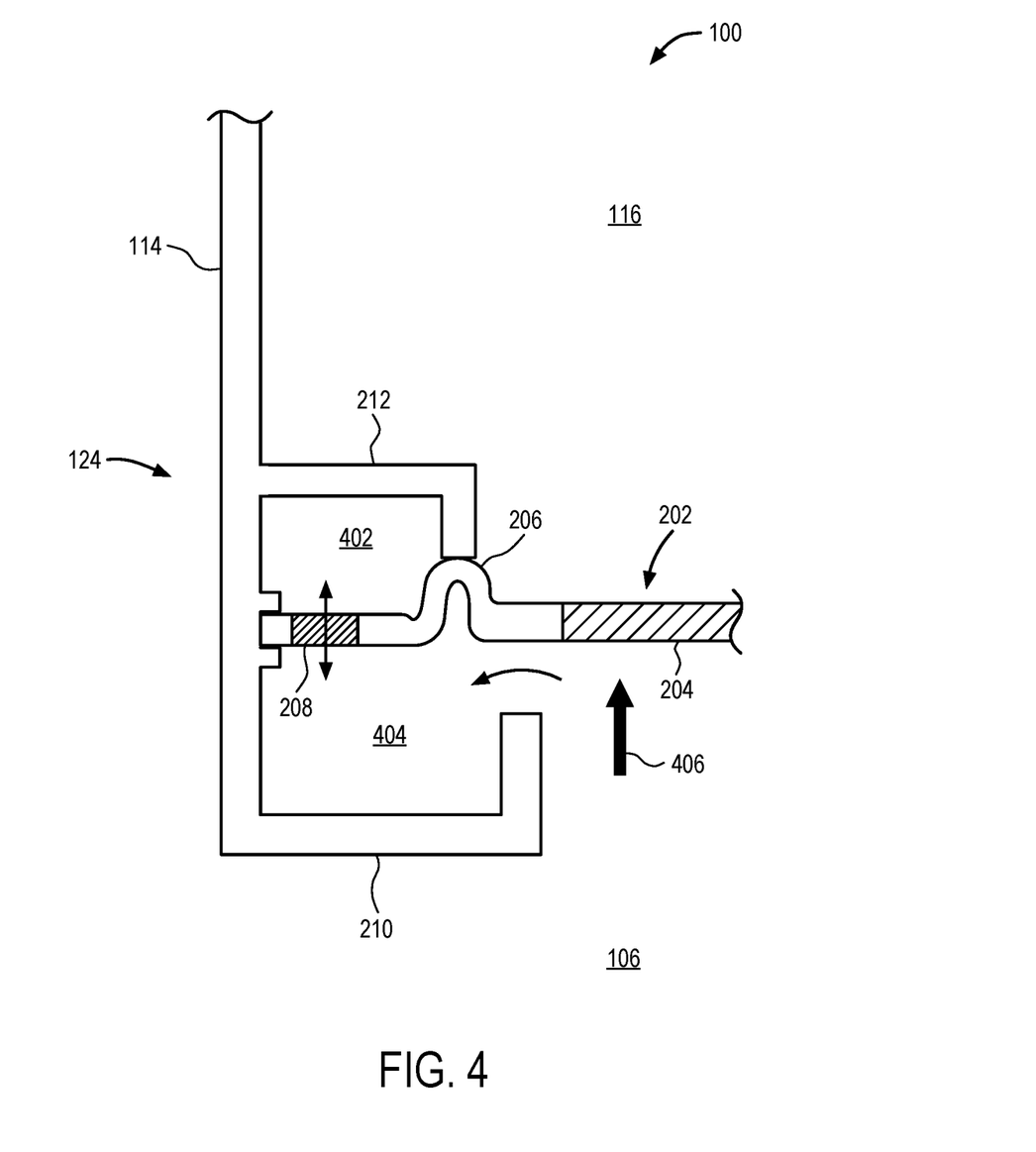
FIG. 4 illustrates a magnified cross-sectional side view of the impulse pressure rejecting valve of FIG. 2 in a closed position.

FIG. 4 illustrates a magnified cross-sectional view of a left side of the valve 124 in a first closed position. Representatively, as illustrated by arrow 406, when a positive impulse pressure occurs in the interior chamber 106, the positive impulse pressure causes the valve diaphragm 202 to move toward the first sealing surface 212. The surround 206, in turn, contacts and seals against the first sealing surface 212. As shown by the arrows, the positive impulse pressure may cause a fluid to travel through the space 404 below the surround 206 and up to the space 402 above the surround 206 but it cannot pass the first sealing surface 212. As long as the positive impulse pressure is present, the surround 206 remains sealed preventing fluid communication between the interior chamber 106 and the back volume chamber 116. A positive impulse pressure or positive pressure change may be caused by an event which increases a pressure in the interior chamber 106 so that it is greater than a pressure in the back volume chamber 116. In other aspects, the positive impulse pressure or positive pressure change may also be defined as a pressure event that increases the pressure above atmospheric pressure and that is relatively short in duration and high in magnitude. For example, a user pressing on the enclosure of the devices may cause the positive impulse pressure as previously discussed.

Figure 5:
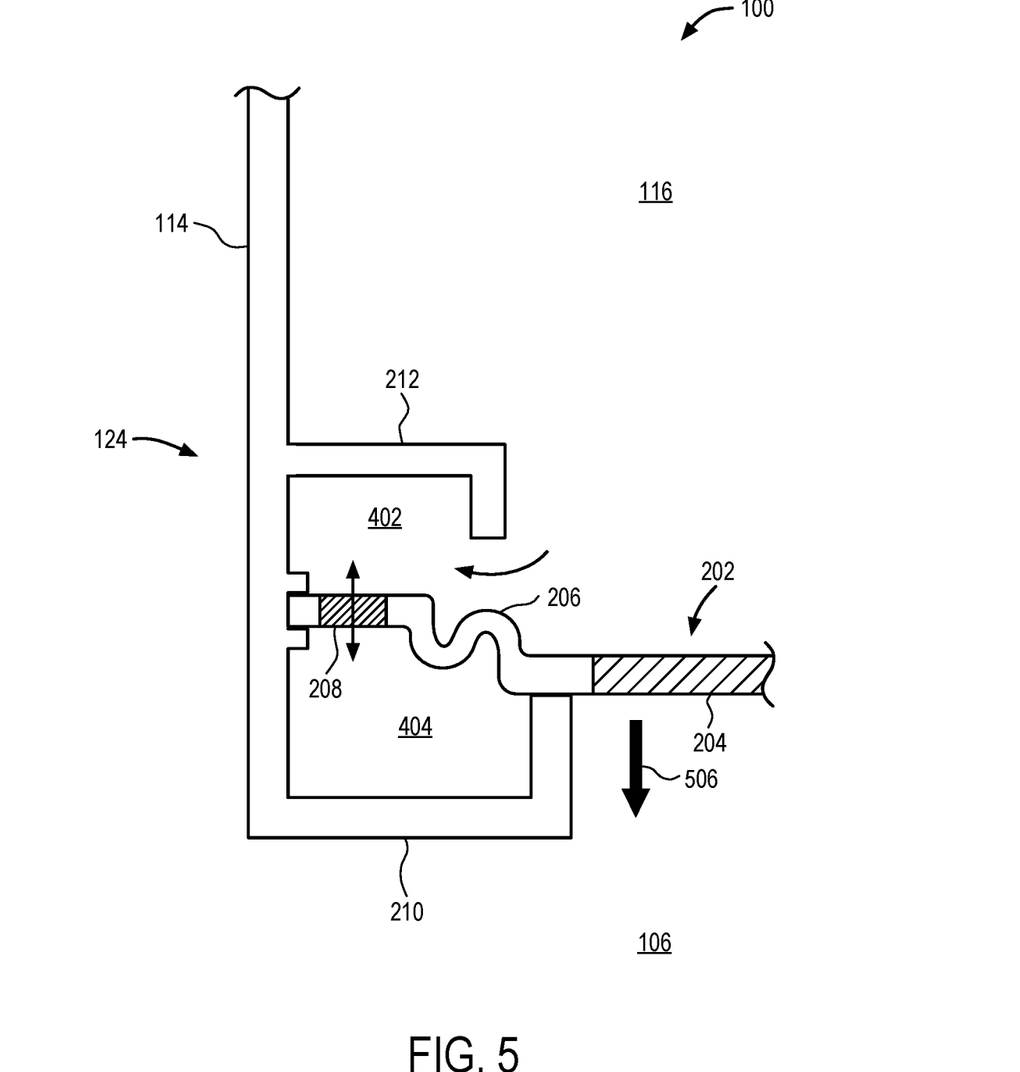
FIG. 5 illustrates a magnified cross-sectional side view of the impulse pressure rejecting valve of FIG. 2 in a closed position.

FIG. 5 illustrates a magnified cross-sectional view of a left side of the valve 124 in a second closed position. Representatively, as illustrated by arrow 506, when a negative impulse pressure occurs in the interior chamber 106, the negative impulse pressure causes the valve diaphragm 202 to move toward the second sealing surface 210. The surround 206, in turn, contacts and seals against the second sealing surface 210. As shown by the arrows, the negative impulse pressure may cause a fluid to travel through the space 402 above the surround 206 and down to the space 404 below the surround 206 but it cannot pass the second sealing surface 210. As long as the negative impulse pressure is present, the surround 206 remains sealed preventing fluid communication between the interior chamber 106 and the back volume chamber 116. A negative impulse pressure or negative pressure change may be caused by an event which decreases a pressure in the interior chamber 106 so that it is less than a pressure in the back volume chamber 116. In other aspects, the negative impulse pressure or negative pressure change may also be defined as a pressure event that decreases the pressure below atmospheric pressure and that is relatively short in duration and high in magnitude. For example, when a user stops pressing on the enclosure a negative impulse pressure may occur.

It should be understood, however, that over time the aperiodic vent 208 (in addition to the b-vent 128) will allow the pressure to equalize across the valve 124 causing the valve to open. In particular, as previously discussed, the aperiodic vent 208 includes a flow resistor mesh. The mesh may have a specific time constant to allow the pressure to pass through it. This time constant depends on the resistivity of the mesh (unit in Rayleigh=P·s/m). During this period the pressure at both sides of the mesh slowly reaches to the equilibrium point and allows the valve to open. It may further be understood that the opening and closing of the valve utilizes the time it takes to bring the two sides of the mesh to equilibrium to deflect the valve diaphragm 202, which has a specific mass and a stiffness coefficient. The deflection of the valve diaphragm 202 may be tuned in such a way that, within the duration of the time constant of the mesh, it reaches the first sealing surface 212 or the second sealing surface 210 (either in positive or negative pressure events). Once this mechanical maximum of the valve diaphragm 202 is reached as shown in FIG. 4 and FIG. 5 the valve is closed and prevents the impulse pressure event from reaching the back volume chamber and causing an excessive movement of the speaker.

For example, in one aspect, a working frequency of the valve may be set at a frequency found to cause minimal irregularity in a frequency response of the speaker, for example, at 2000 Hz. The valve diaphragm 202 could be tuned to operate at the desired working frequency by reducing the mass of the center portion 204 instead of increasing the stiffness of the surround 206. Such tuning allows the valve 124 to be operated by impulse pressure changes originating from the screen press events. In addition, the valve diaphragm 202 may be tuned so that pressure changes caused by music or content playback do not close the valve 124. For example, the valve membrane or diaphragm 202 may be tuned so that the excursion of the valve membrane or diaphragm 202 during screen press events is large enough to allow the surround 206 to seal to a sealing surface while an excursion of the valve membrane or diaphragm 202 during the normal speaker operation is not.

FIG. 6 illustrates a block diagram of one aspect of an electronic device within which the previously discussed speaker may be implemented. As shown in FIG. 6, device 600 may include storage 602. Storage 602 may include one or more different types of storage such as hard disk drive storage, nonvolatile memory (e.g., flash memory or other electrically-programmable-read-only memory), volatile memory (e.g., battery-based static or dynamic random-access-memory), etc.

Processing circuitry 604 may be used to control the operation of device 600. Processing circuitry 604 may be based on a processor such as a microprocessor and other suitable integrated circuits. With one suitable arrangement, processing circuitry 604 and storage 602 are used to run software on device 600, such as internet browsing applications, voice-over-internet-protocol (VOIP) telephone call applications, email applications, media playback applications, operating system functions, etc. Processing circuitry 604 and storage 602 may be used in implementing suitable communications protocols. Communications protocols that may be implemented using processing circuitry 604 and storage 602 include internet protocols, wireless local area network protocols (e.g., IEEE 802.11 protocols—sometimes referred to as Wi-Fi®), protocols for other short-range wireless communications links such as the Bluetooth® protocol, protocols for handling 3G or 4G communications services (e.g., using wide band code division multiple access techniques), 2G cellular telephone communications protocols, etc.

To minimize power consumption, processing circuitry 604 may include power management circuitry to implement power management functions. For example, processing circuitry 604 may be used to adjust the gain settings of amplifiers (e.g., radio-frequency power amplifier circuitry) on device 600. Processing circuitry 604 may also be used to adjust the power supply voltages that are provided to portions of the circuitry on device 600. For example, higher direct-current (DC) power supply voltages may be supplied to active circuits and lower DC power supply voltages may be supplied to circuits that are less active or that are inactive. If desired, processing circuitry 604 may be used to implement a control scheme in which the power amplifier circuitry is adjusted to accommodate transmission power level requests received from a wireless network.

Input-output devices 606 may be used to allow data to be supplied to device 600 and to allow data to be provided from device 600 to external devices. Display screens, microphone acoustic ports, speaker acoustic ports, and docking ports are examples of input-output devices 606. For example, input-output devices 606 can include user input-output devices 608 such as buttons, touch screens, joysticks, click wheels, scrolling wheels, touch pads, key pads, keyboards, microphones, cameras, etc. A user can control the operation of device 600 by supplying commands through user input devices 608. Display and audio devices 610 may include liquid-crystal display (LCD) screens or other screens, light-emitting diodes (LEDs), and other components that present visual information and status data. Display and audio devices 610 may also include audio equipment such as speakers and other devices for creating sound. Display and audio devices 610 may contain audio-video interface equipment such as jacks and other connectors for external headphones and monitors.

Wireless communications devices 612 may include communications circuitry such as radio-frequency (RF) transceiver circuitry formed from one or more integrated circuits, power amplifier circuitry, passive RF components, antennas, and other circuitry for handling RF wireless signals. Wireless signals can also be sent using light (e.g., using infrared communications). Representatively, in the case of a speaker acoustic port, the speaker may be associated with the port and be in communication with an RF antenna for transmission of signals from the far end user to the speaker.

Returning to FIG. 6, device 600 can communicate with external devices such as accessories 614, computing equipment 616, and wireless network 618 as shown by paths 620 and 622. Paths 620 may include wired and wireless paths. Path 622 may be a wireless path. Accessories 614 may include headphones (e.g., a wireless cellular headset or audio headphones) and audio-video equipment (e.g., wireless speakers, a game controller, or other equipment that receives and plays audio and video content), a peripheral such as a wireless printer or camera, etc.

Computing equipment 616 may be any suitable computer. With one suitable arrangement, computing equipment 616 is a computer that has an associated wireless access point (router) or an internal or external wireless card that establishes a wireless connection with device 600. The computer may be a server (e.g., an internet server), a local area network computer with or without internet access, a user's own personal computer, a peer device (e.g., another portable electronic device), or any other suitable computing equipment.

Wireless network 618 may include any suitable network equipment, such as cellular telephone base stations, cellular towers, wireless data networks, computers associated with wireless networks, etc. For example, wireless network 618 may include network management equipment that monitors the wireless signal strength of the wireless handsets (cellular telephones, handheld computing devices, etc.) that are in communication with network 618.

While certain aspects have been described and shown in the accompanying drawings, it is to be understood that such aspects are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting. For example, although a speaker is specifically disclosed herein, the valve disclosed herein could be used with other types of transducers, for example, microphones. Still further, although a portable electronic device such as a mobile communications device is described herein, any of the previously discussed valve and transducer configurations may be implemented within a tablet computer, personal computer, laptop computer, notebook computer, headphones and the like. In addition, to aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What is claimed is:

1. A portable electronic device comprising:
an enclosure having an enclosure wall that forms an interior chamber and a sound output port to an ambient environment;
a speaker positioned within the interior chamber, the speaker having a front volume chamber coupling a sound output surface of the speaker to the sound output port and a back volume chamber acoustically coupled to the interior chamber by an aperiodic vent; and
a valve operable to transition between an open position and a closed position in response to a pressure change, and wherein the aperiodic vent is formed in the valve.

2. The portable electronic device of claim 1 wherein the pressure change is a pressure increase in the interior chamber above a pressure in the back volume chamber, or a pressure decrease in the interior chamber below a pressure in the back volume chamber.

3. The portable electronic device of claim 2 wherein the pressure increase or the pressure decrease causes the valve to transition to the closed position and close the aperiodic vent to prevent the pressure increase or the pressure decrease from causing a vibration of the sound output surface of the speaker.

4. The portable electronic device of claim 2 wherein the pressure increase or the pressure decrease is caused by an external force applied to, or removed from, the enclosure wall.

5. The portable electronic device of claim 1 wherein the pressure change is a pressure equalization between the back volume chamber and the interior chamber, and the pressure equalization causes the valve to transition to the open position and open the aperiodic vent to allow fluid flow between the back volume chamber and the interior chamber.

6. The portable electronic device of claim 5 wherein the pressure equalization occurs through the aperiodic vent.

7. The portable electronic device of claim 1 wherein the aperiodic vent comprises a flow resistive mesh that allows a fluid to leak between the back volume chamber and the interior chamber when the aperiodic vent is open.

8. The portable electronic device of claim 1 wherein the valve comprises a compliant membrane between the back volume chamber and the interior chamber and the aperiodic vent is formed in the compliant membrane.

9. The portable electronic device of claim 8 wherein in the closed position, the compliant membrane seals to a first sealing surface between the compliant membrane and the back volume chamber or a second sealing surface between the compliant membrane and the interior chamber to close the aperiodic vent.

10. A portable electronic device comprising:
an enclosure having an enclosure wall that forms an interior chamber;
a driver module positioned within the interior chamber, the driver module having a driver and a module wall forming a back volume chamber of the driver, wherein the back volume chamber comprises an opening in the module wall to the interior chamber; and an impulse pressure rejecting valve coupled to the opening, the impulse pressure rejecting valve having a flow resistive mesh coupled to a valve diaphragm that transitions to a closed position in response to an impulse pressure and an open position in the absence of the impulse pressure.

11. The portable electronic device of claim 10 wherein the driver is a speaker and the impulse pressure is different than a sound pressure output by the speaker.

12. The portable electronic device of claim 10 wherein the impulse pressure is caused by a user applying a force to, or removing a force from, the enclosure wall.

13. The portable electronic device of claim 10 wherein in the closed position, the valve diaphragm prevents fluid flow between the back volume chamber and the interior chamber through the flow resistive mesh.

14. The portable electronic device of claim 10 wherein in the open position, the valve diaphragm allows fluid flow between the back volume chamber and the interior chamber through the flow resistive mesh.

15. The portable electronic device of claim 10 wherein the flow resistive mesh comprises a resistivity sufficient to allow for pressure equalization of the impulse pressure over time so that the valve diaphragm transitions to the open position.

16. The portable electronic device of claim 10 wherein the flow resistive mesh is part of an aperiodic vent formed through the valve diaphragm.

17. The portable electronic device of claim 10 wherein the valve diaphragm comprises a center portion aligned with the opening in the module wall and a surround portion that couples the center portion to the module wall, and wherein the flow resistive mesh is coupled to the surround portion.

18. The portable electronic device of claim 17 wherein in the closed position, the surround portion seals to a first sealing surface between the valve diaphragm and the back volume chamber or a second sealing surface between the valve diaphragm and the interior chamber.

19. The portable electronic device of claim 18 wherein a positive impulse pressure seals the valve diaphragm to the first sealing surface.

20. The portable electronic device of claim 18 wherein a negative impulse pressure seals the valve diaphragm to the second sealing surface.

* * * * *